United States Patent
Coogle

(10) Patent No.: US 8,156,956 B1
(45) Date of Patent: *Apr. 17, 2012

(54) REFRIGERATION CONDENSATE LINE CONNECTORS

(76) Inventor: Gregory Coogle, Pembroke Pines, FL (US)

(*) Notice: Subject to any disclaimer, the term of this patent is extended or adjusted under 35 U.S.C. 154(b) by 294 days.

This patent is subject to a terminal disclaimer.

(21) Appl. No.: 12/462,008

(22) Filed: Jul. 28, 2009

Related U.S. Application Data

(63) Continuation-in-part of application No. 12/012,988, filed on Feb. 7, 2008, now Pat. No. 7,624,756.

(51) Int. Cl.
  *F16L 37/00* (2006.01)
  *G05D 7/00* (2006.01)
(52) U.S. Cl. ............... 137/240; 137/271; 62/291
(58) Field of Classification Search ........... 137/240, 137/312, 558, 269, 271; 62/291
See application file for complete search history.

(56) References Cited

U.S. PATENT DOCUMENTS

| | | | |
|---|---|---|---|
| 5,976,364 A | 11/1999 | Williams | |
| 6,651,690 B1 | 11/2003 | Coogle | |
| 6,683,535 B1 | 1/2004 | Utke | |
| 6,701,740 B1* | 3/2004 | Hernandez-Zelaya | 62/291 |
| 6,708,717 B1 | 3/2004 | Coogle | |
| 7,191,649 B1* | 3/2007 | Coogle | 73/313 |
| 7,624,756 B1* | 12/2009 | Coogle | 137/558 |
| 2006/0096638 A1 | 5/2006 | Coogle | |

* cited by examiner

*Primary Examiner* — Kevin Lee
(74) *Attorney, Agent, or Firm* — Alvin S. Blum

(57) ABSTRACT

An assembly mounts between the drain pan that collects condensate water from an air conditioner and the drain line. It includes a housing with a first end connected to the pan. A second end connects to the drain line. A shut off valve shuts off the passage to the pan while maintenance is performed. A connector is mounted on the housing between the valve and the second end. It is a female member of a water hose coupling. A male member of the coupling may be screwed in to seal it in place. Male members may have different terminations at a second end, including a barbed tube for resilient tubing, a compressed air tire valve for delivering gas, a compressed nitrogen coupling, a tapered funnel for the nozzle of vacuum/blower, and a water sensor.

4 Claims, 5 Drawing Sheets

US 8,156,956 B1

REFRIGERATION CONDENSATE LINE CONNECTORS

This application is a continuation in part of patent application Ser. No. 12/012,988 filed Feb. 7, 2008, now U.S. Pat. No. 7,624,756.

FIELD OF THE INVENTION

This invention relates generally to air conditioning apparatus and more particularly to apparatus for maintenance of the water line that drains water from a pan that receives water that condenses on the evaporator coils of an air conditioning system.

BACKGROUND OF THE INVENTION

It is well known in the art to provide a receptacle such as a tray or pan beneath the evaporator coils of an air conditioner to receive water that condenses from the air as it is cooled. A drain line is generally connected to a side wall of the tray to drain the condensate water as it accumulates. Because water may stand still in the system, various microorganisms may grow in the tray and drain pipe until they clog up the drainage system. When this occurs, overflowing water may cause considerable damage. Because the drainage system and tray are out of sight and may be relatively inaccessible, they may be neglected until damage occurs. Clearing obstructions in the drain line and routine maintenance of the drain line are now generally done by manually disconnecting the drain line and blowing out obstructions and/or applying biocidal fluids. The drain line is then reconnected. A less labor intensive and convenient system would encourage routine maintenance and avoid complete blockage.

SUMMARY OF THE INVENTION

It is accordingly an object of the invention to provide an assembly that mounts between the drain pan and the drain line that has a variety of attachments for monitoring and cleaning the drain line to facilitate maintenance. The assembly includes a housing with an internal passage between its two ends. A first end is connected to the water outlet from the pan that receives condensate water from the evaporator. A second end is connected to the drain line so that water from the condensate pan flows through the internal passage. A shut off valve is provided adjacent the first end to shut off the passage to the pan while maintenance is performed on the drain line. A connector is mounted on an uppermost portion of the housing between the shut off valve and the second end. This connector is in fluid communication with the internal passage. It is a female connector for a garden hose of the type found at household hose bibs. A receptacle may be supplied in the housing directly below the female connector that is in fluid communication with the passage. It is designed to receive biocidal pellets through the connector. These pellets are designed to slowly release biocidal materials into the water to retard the formation of microorganisms that contribute to clogging the drain line. A male member of the coupling may be screwed in by rotation of the ring on the female coupling to seal it in place. The male member is easily removed by unscrewing the ring to unseal it. A plurality of male members are provided to perform a variety of functions. Each male member has one end with garden hose coupling thread at one end. The male members may be supplied with different terminations at a second end, including the following:

1. A barbed tube for connection to a resilient tubing that may supply fluid such as air or liquid to dislodge and/or wash away an obstruction or flush the drain line after the shut off valve is closed;
2. A compressed air tire valve for delivering compressed air;
3. A compressed gas coupling for delivering nitrogen;
4. A tapered funnel adapted to receive the nozzle of a wet vacuum/blower hose;
5. A sealing plug; and
6. A two-electrode water sensor that can activate a signal when water in a plugged drain line rises enough to wet the electrodes. The elution of biocidal materials may increase the electrical conductivity of the water and thereby enhance the sensor function.

These and other objects, features, and advantages of the invention will become more apparent from the detailed description of an exemplary embodiment thereof as illustrated in the accompanying drawings, in which like elements are designated by like reference characters in the various drawing figures.

DETAILED DESCRIPTION OF PREFERRED EMBODIMENTS

Figure 1:
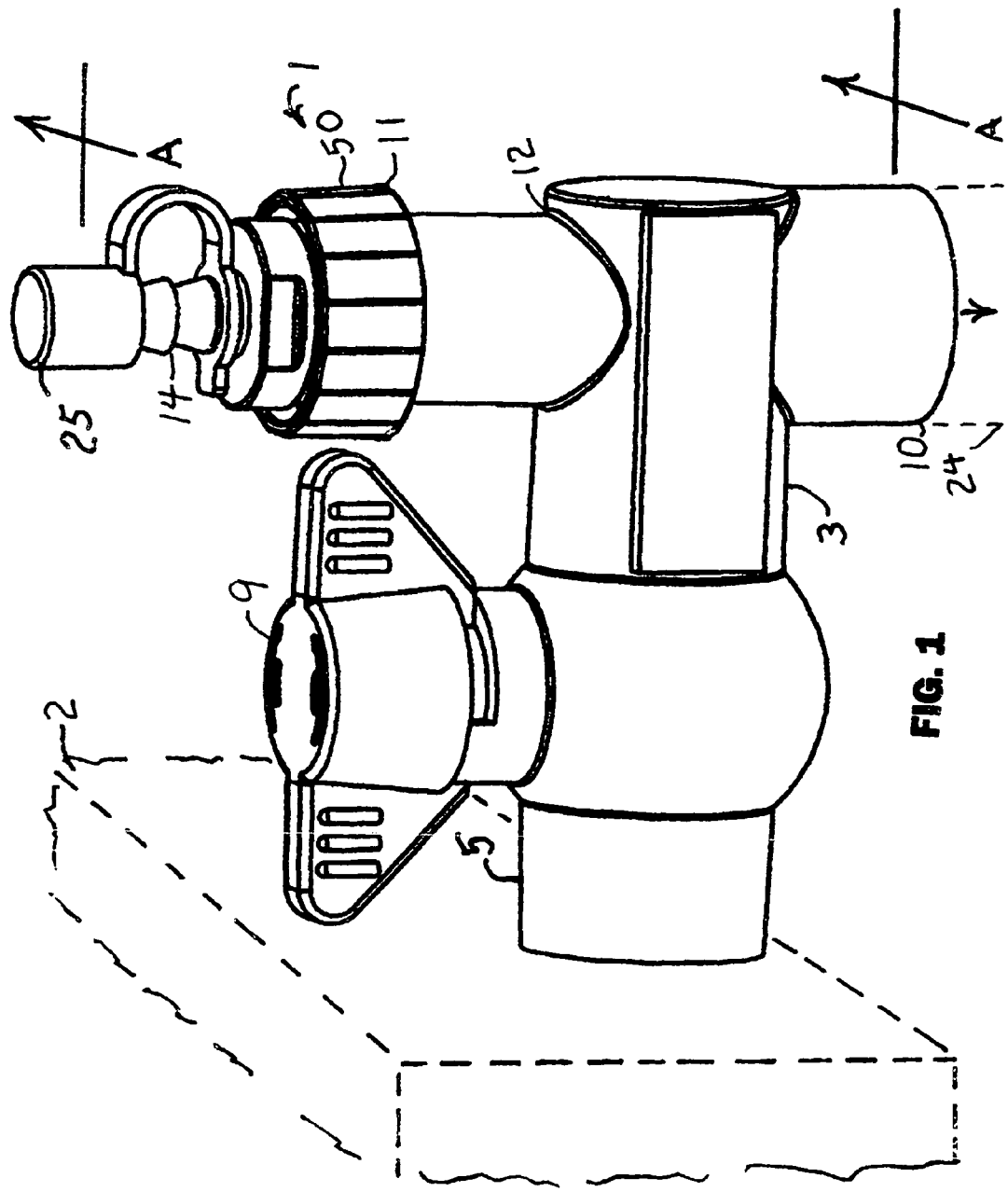
FIG. 1 is a perspective view of the assembly of the invention with a barbed connector in place.

Referring now to the drawing Figures, an assembly 1 of the invention includes a housing 3 that has an internal passage 4 with a first end 5 having a first end connector 7 for sealingly connecting to the vertical wall of a condensate pan 2 (shown in phantom). The condensate pan is the type located beneath the coils of a refrigeration evaporator such as found in air conditioning apparatus. Water in air passing over the cooling coils condenses out of the air as it cools. That water condenses on the coils and drips down and collects in the pan. Water in the pan is continuously drained to the outside through a drain pipe 24 (shown in phantom). Debris, often due to microorganism growth, may clog up the drain line. That may cause the drain pan to overflow, causing water damage. Cleaning a clogged drain line may be labor intensive and costly, in addition to the water overflow damage.

Figure 2:
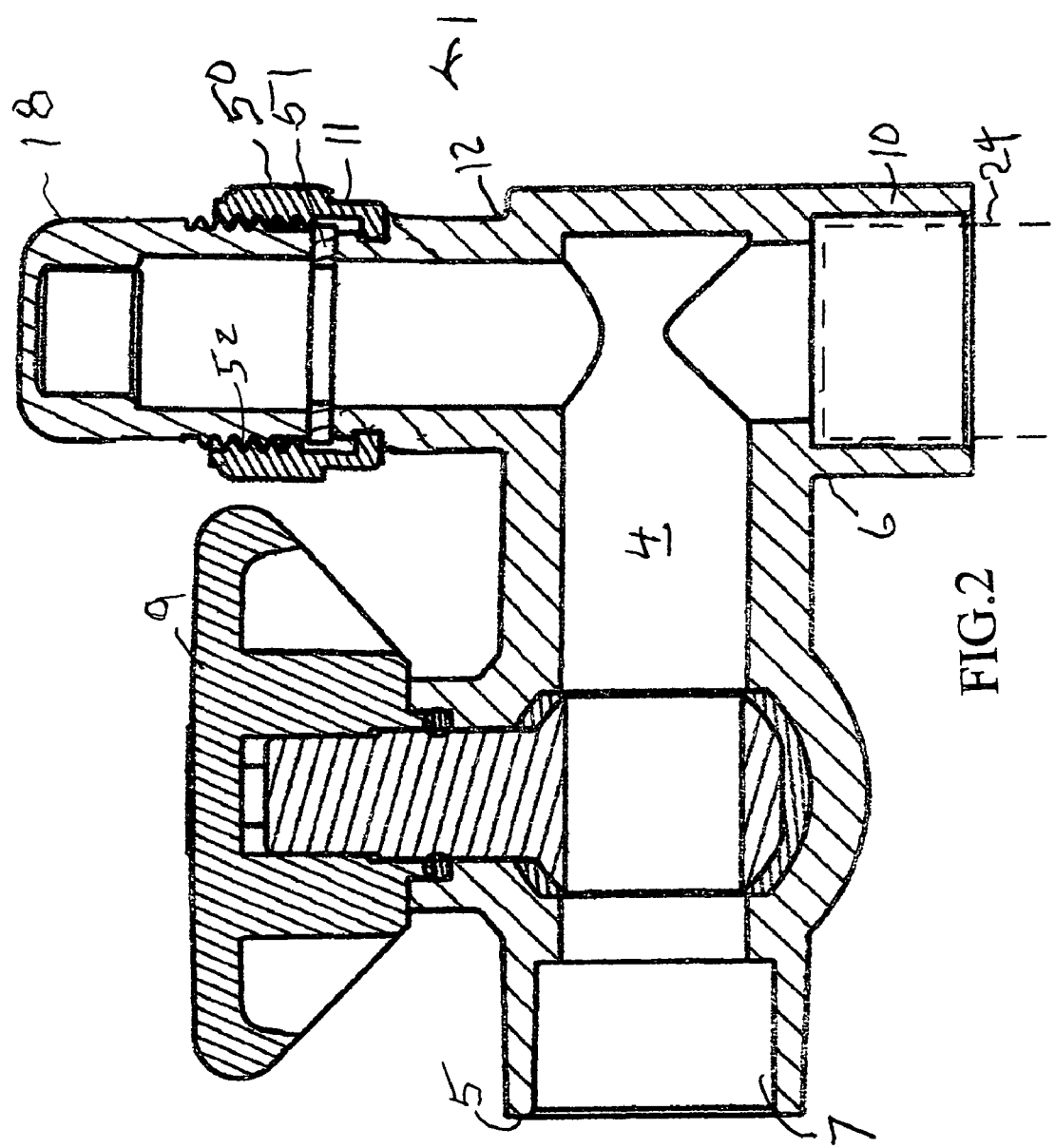
FIG. 2 is a sectional view through line A-A of FIG. 1, with a sealing cap replacing the barbed connector.
Figure 9:
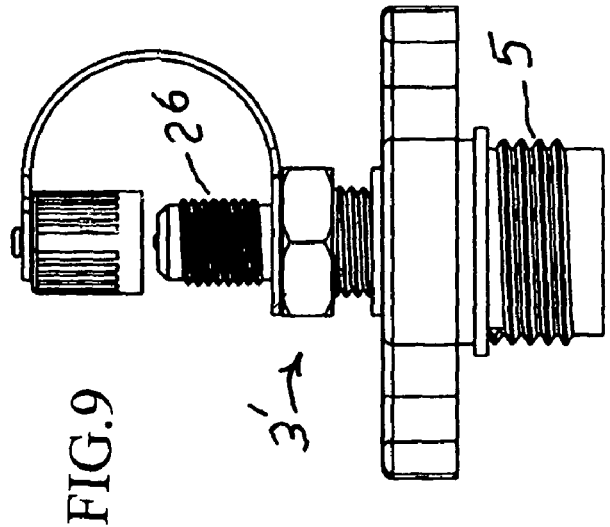
FIG. 9 is a front elevation view of the compressed nitrogen connector.

The assembly 1 of the invention is introduced in the drainage system by interposing it between the pan 2 and the drain pipe 24. Second connector 10 at the second end 6 of the housing is connected to the drain pipe 24. As shown in FIG. 2, the passage 4 makes a 90. degree turn to the drain. In some plumbing situations, the passage may be straight as shown in FIG. 9, or other shape, not shown, may be employed. This assembly facilitates routine maintenance, flushing out clogs, and also may provide a continuous monitor of drainage. A shut off valve 9 is provided adjacent to the first end 5 to cut off the passage to the pan while applying means such as forcing fluid to clean and/or dislodge any clogs in the drain line.

A third connector 11 on the upper surface 12 of the housing is in fluid communication with the passage. It is a female member of a water hose coupling of the type on the hose bib outside a residence for connecting a garden hose. The connector is positioned between the valve and the second end 6. These couplings are well known in the art. They enable a quick and positive seal of any one of a number of male members to the coupling by rotating the ring 50 that surrounds the female portion. This draws down the male threaded member 52 until it is sealed against the rubber sealing washer 51. As shown in FIG. 2, a sealing cap 18 may be applied when the connector 11 is not in use.

Figure 3:
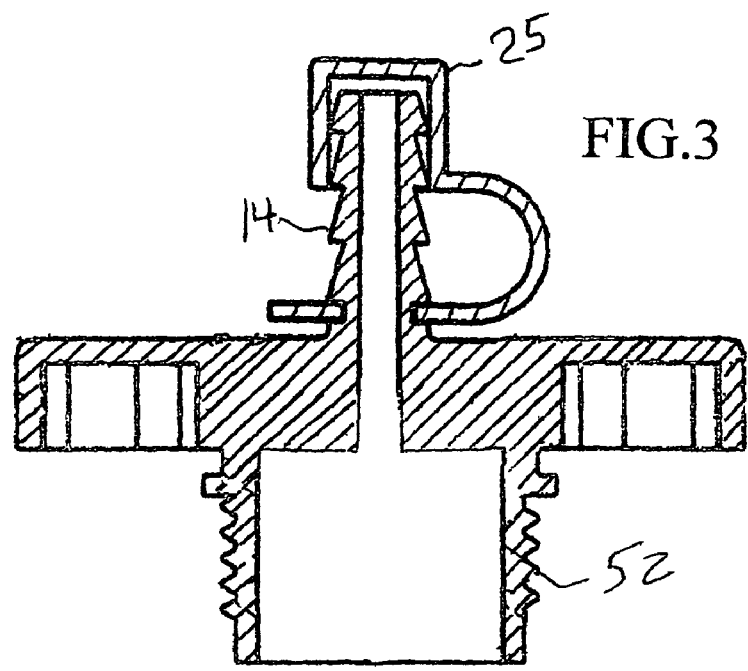
FIG. 3 is a sectional view of a connector with barbed tube.

As shown in FIGS. 1-3, a male member in the form of a barbed tube termination 14 may be provided at a second end. This enables the sealing of a resilient tube (not shown) to the assembly that may carry a cleaning liquid or gas to blow out or flush out the line after closing valve 9. A tethered sealing cap 25 may also be provided.

Figure 4:
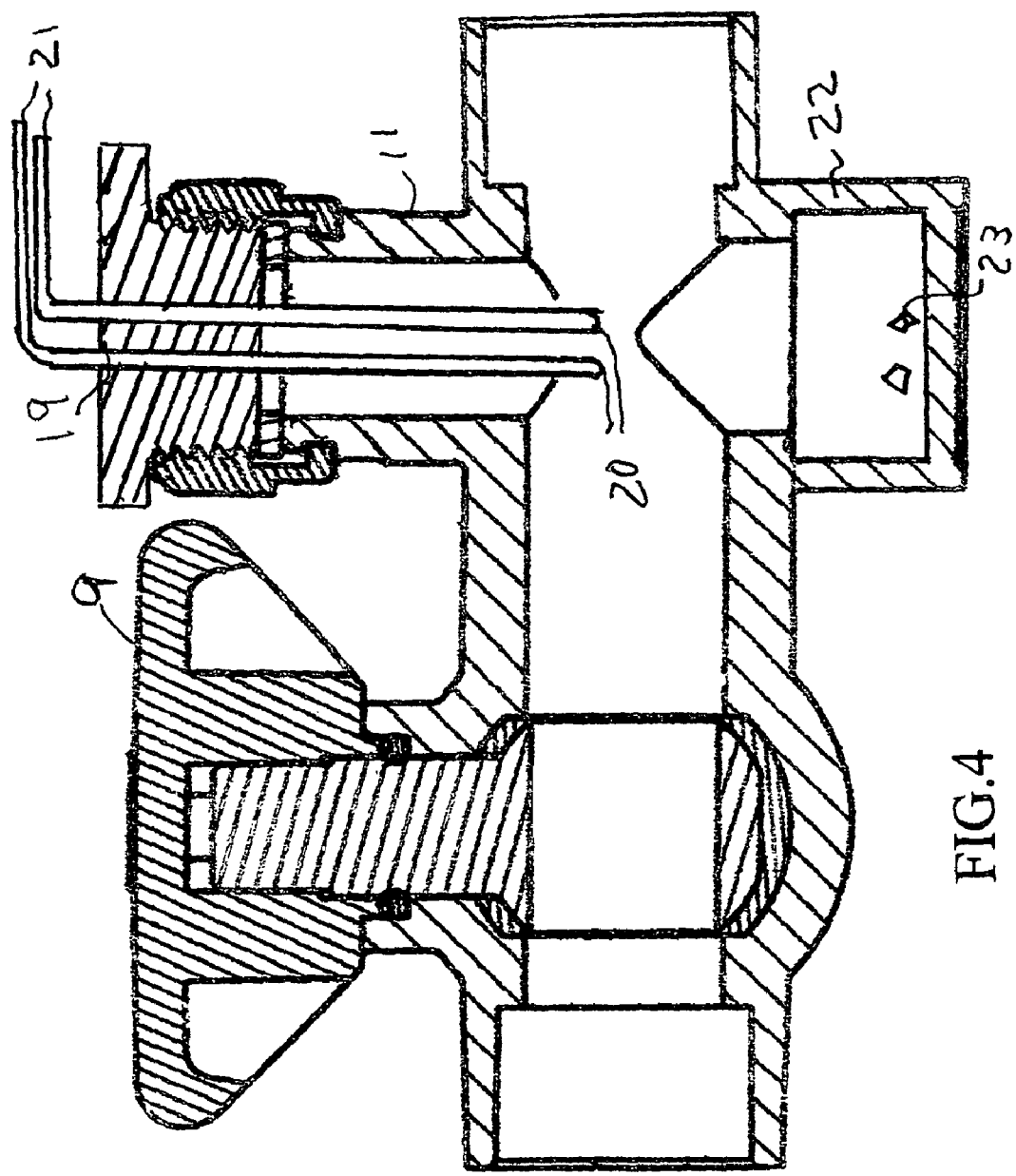
FIG. 4 is a sectional view of another embodiment with a water sensor in place.

FIG. 4 shows the use of a two-electrode water sensor 19 as the male member of the coupling. It is left in place after the line is clear and the valve 9 is opened. If at any time the line should clog, the water will rise in the passage and come into contact with the two electrodes 20. The wires 21 are connected to a voltage, a current detector, and an alarm (not shown). When the two electrodes are immersed, any ions in the water will cause a current to flow between the two electrodes. The current detector will detect the flow of current and actuate the alarm, audible and/or visible to signal that the line is clogged, before any overflow and damage has occurred. It may also be connected to a relay to shut off the air conditioning so that no more condensate water will form. A receptacle 22 may be optionally provided in line with third connector 11 to hold biocidal material 23 such as copper sulfate. This will suppress growth of clogging organisms. It will also increase the electrolytic conductivity of the condensate water to enhance the function of the water level sensor 19.

Figure 6:
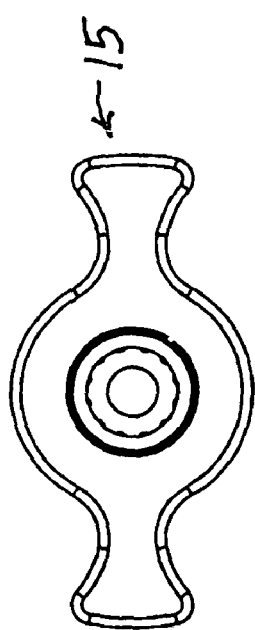
FIG. 6 is a top view of the tire valve connector.
Figure 5:
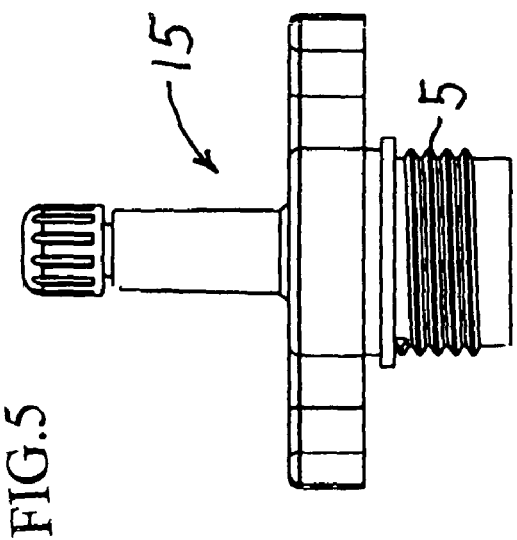
FIG. 5 is a front elevation view of a tire valve connector.

FIGS. 5 and 6 show a compressed air tire valve male member 15 of the coupling. A compressed gas tank fitted with the hose and end fitting for filling tires may be used to blow out any clog using this device.

Figure 7:
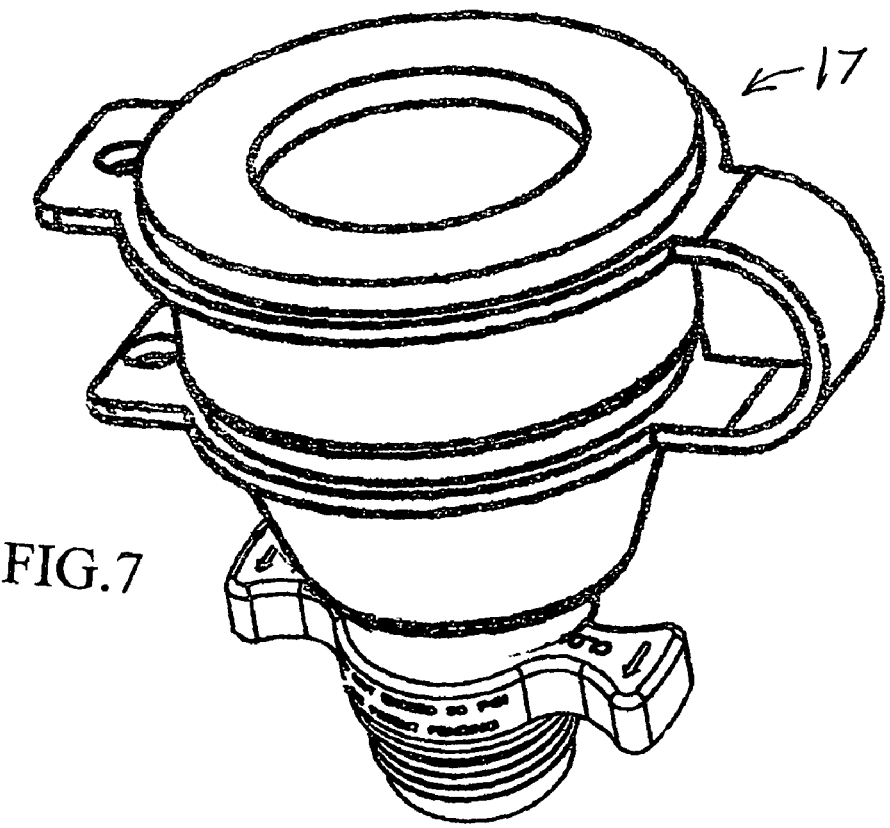
FIG. 7 is a perspective view of a tapered funnel connector.

FIG. 7 shows a tapered funnel male member 17 of the coupling. This will conveniently receive the tapered free end of the hose from a dry/wet vacuum/blower machine (not shown). This may be used to alternatively suck or blow out the drain line.

Figure 8:
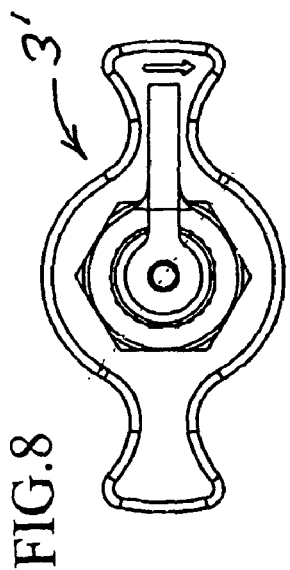
FIG. 8 is a top view of the compressed nitrogen connector.

FIGS. 8 and 9 show a housing 3' with a compressed nitrogen coupling 26 for connection to a hose from a tank of nitrogen.

While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. An assembly for facilitating maintenance of a drain line that drains condensate water from a pan beneath an evaporator, the assembly comprising:
    a housing having an internal passage with a first end and a second end;
    a first connector on the housing for securely connecting the internal passage at the first end to a water outlet of the pan;
    a shut off valve adjacent the first end for manually closing the internal passage;
    a second connector on the housing for connecting the drain line to the second end of the passage;
    a third connector in fluid connection with the passage, the third connector mounted on an upper surface of the housing positioned intermediate the valve and the second connector, the third connector being a female member of a hose coupling; and
    a plurality of male member connectors having a male hose coupling compatible with the female member at a first end, the male member connectors having one of the terminations at a second end selected from the group of terminations consisting of a barbed tube for a resilient hose, a compressed air tire valve, a compressed nitrogen coupling, and a tapered funnel adapted for receiving a hose from a wet vacuum/blower.

2. The assembly according to claim 1 further comprising a receptacle in the housing in fluid communication with the passage positioned directly below the third connector, the receptacle constructed for receiving biocidal material deposited through the third connector.

3. An assembly for facilitating maintenance of a drain line that drains condensate water from a pan beneath an evaporator, the assembly comprising:
    a housing having an internal passage with a first end and a second end;
    a first connector on the housing for securely connecting the internal passage at the first end to a water outlet of the pan;
    a shut off valve adjacent the first end for manually closing the internal passage;
    a second connector on the housing for connecting the drain line to the second end of the passage;
    a third connector in fluid communication with the passage, the third connector mounted on an upper surface of the housing positioned intermediate the valve and the second connector, the third connector being a female member of a water hose coupling;
    a receptacle in the housing in fluid communication with the passage positioned directly below the third connector constructed for receiving biocidal material deposited through the third connector; and
    a plurality of male member connectors having a male water hose coupling compatible with the female member at a first end, the male member connectors having a termination at a second end selected from the group of terminations consisting of a barbed tube for a resilient hose, a compressed air tire valve, a compressed nitrogen coupling, and a tapered funnel adapted for a hose from a wet vacuum/blower.

4. An assembly for facilitating maintenance of a drain line that drains condensate water from a pan beneath an evaporator, the assembly comprising:
    a housing having an internal passage with a first end and a second end;
    a first connector on the housing for securely connecting the internal passage at the first end to a water outlet of the pan;
    a shut off valve adjacent the first end for manually closing the internal passage;
    a second connector on the housing for connecting the drain line to the second end of the passage;
    a third connector in fluid communication with the passage, the third connector mounted on an upper surface of the housing positioned intermediate the valve and the second connector, the third connector being a female member of a water hose coupling;

a receptacle in the housing in fluid communication with the passage positioned directly below the third connector constructed for receiving biocidal material deposited through the third connector; and a plurality of male member connectors having a male member of a water hose coupling compatible with the female member at a first end, a first male member connector having a barbed tube for a resilient hose termination at a second end; a second male member connector having a compressed air tire valve at a second end; a third male member connector having a tapered funnel adapted for a hose from a wet vacuum/blower at a second end; and a fourth male member connector having a compressed nitrogen coupling at a second end.

* * * * *